US010892797B2

United States Patent
Baek et al.

(10) Patent No.: US 10,892,797 B2
(45) Date of Patent: Jan. 12, 2021

(54) METHOD AND APPARATUS FOR PROCESSING UPLINK SIGNAL IN CABLE BROADCASTING NETWORK

(71) Applicant: Electronics and Telecommunications Research Institute, Daejeon (KR)

(72) Inventors: Myung-Sun Baek, Daejeon (KR); Jin Hyuk Song, Daejeon (KR); Joon Young Jung, Daejeon (KR); Heung Mook Kim, Daejeon (KR); Eun Hee Hyun, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 16/737,760

(22) Filed: Jan. 8, 2020

(65) Prior Publication Data

US 2020/0220573 A1 Jul. 9, 2020

(30) Foreign Application Priority Data

Jan. 8, 2019 (KR) .................. 10-2019-0002458

(51) Int. Cl.
*H04B 3/02* (2006.01)
*H04L 27/34* (2006.01)
*H04L 12/64* (2006.01)

(52) U.S. Cl.
CPC ........... *H04B 3/02* (2013.01); *H04L 27/3405* (2013.01); *H04L 2012/6421* (2013.01)

(58) Field of Classification Search
CPC .................. H04B 3/02; H04L 27/3405; H04L 2012/6421
See application file for complete search history.

(56) References Cited

U.S. PATENT DOCUMENTS

| 5,991,308 A * | 11/1999 | Fuhrmann | ........... H03M 13/256 370/395.53 |
| 6,928,656 B1 | 8/2005 | Addington | |
| H2274 H * | 5/2013 | Huttle | ................. H04B 14/026 370/212 |
| 8,571,146 B1 * | 10/2013 | Eliaz | ...................... H04B 1/709 375/340 |
| 2013/0343206 A1 * | 12/2013 | Wilhoite | ................. H04L 67/24 370/250 |
| 2017/0279485 A1 | 9/2017 | Kim et al. | |
| 2017/0279550 A1 | 9/2017 | Park et al. | |

* cited by examiner

*Primary Examiner* — Vineeta S Panwalkar
(74) *Attorney, Agent, or Firm* — William Park & Associates Ltd.

(57) ABSTRACT

An apparatus and a method for processing an uplink signal of cable broadcasting network including: modulating uplink data to be transmitted to a broadcasting station which is located at an end of the cable broadcasting network into a plurality of symbols; performing a correlation-coding on the plurality of symbols; and outputting an analog radio frequency (RF) signal corresponding to the plurality of correlation-coded symbols are provided.

13 Claims, 8 Drawing Sheets

METHOD AND APPARATUS FOR PROCESSING UPLINK SIGNAL IN CABLE BROADCASTING NETWORK

CROSS-REFERENCE TO RELATED APPLICATION

This application claims priority to and the benefit of Korean Patent Application No. 10-2019-0002458 filed in the Korean Intellectual Property Office on Jan. 8, 2019, the entire contents of which are incorporated herein by reference.

BACKGROUND OF THE INVENTION

(a) Field of the Invention

This relates to a method and an apparatus for processing an uplink signal in a cable broadcasting network.

(b) Description of the Related Art

A cable broadcasting network connects broadcasting stations and subscribers through a hybrid fiber and coaxial (HFC) network. The HFC network includes optical cables and coaxial cables. From the broadcasting stations to buildings periphery to the subscriber, the content may be transferred by an optical signal through the optical cables, and then the content may be transferred to the subscriber by an electrical signal via the coaxial cables. The cable broadcasting network may provide a bidirectional service such as an Internet service and voice over internet protocol (VoIP) service through a cable modem (CM) device as well as a unidirectional service that simply transmits the broadcast signal.

Recently, the cable broadcasting network has evolved to minimize a use of the coaxial cables. That is, the optical cables are extended to a point very close to the subscriber's building, and even the optical cable may be directly connected to the subscribers home. For example, RFoG (Radio Frequency over Glass) technology is a technology that secures the stability of the broadcasting service and high-speed Internet at the same time by transmitting the cable broadcasting signal through the optical cables. The RFoG can transfer RF-type cable broadcasting signals in real time through fiber to the home (FTTH) rather than the conventional HFC network for the cable broadcasting. However, the RFoG is so expensive to deploy. The cost of an element (all-optical conversion component) used when an RFoG device located in the subscriber's home modulates an uplink RF signal into the optical signal occupies most of the implementation cost. The cost of replacing infrastructure is also high.

Several methods have been proposed to solve this cost problem. For example, in the RoIP (RF over IP) scheme, an analog RF signal transmitted from a subscriber terminal such as a set-top box (STB) may be converted into digital, and then transferred to an optical-based Internet protocol (IP) network. The uplink signal of the STB transmitted from the headend to the IP network may be converted into an analog RF signal and transmitted to a cable modem termination system (CMTS). However, at least four times signal sampling is required to prevent signal loss while the analog RF signal is digitalized. This excessive oversampling greatly increases throughput and reduces transfer rates.

The above information disclosed in this Background section is only for enhancement of understanding of the background and therefore it may contain information that does not form the prior art that is already known in this country to a person of ordinary skill in the art.

SUMMARY OF THE INVENTION

The present disclosure has been made in an effort to provide a method and an apparatus for processing an uplink signal in a cable broadcasting network.

According to an exemplary embodiment, an apparatus for processing an uplink signal of cable broadcasting network is provided. The apparatus includes: a processor, a memory, and a communication unit, wherein the processor executes a program stored in the memory to perform: modulating uplink data to be transmitted to a broadcasting station which is located at an end of a cable broadcasting network into a plurality of symbols; performing a correlation-coding on the plurality of symbols; and outputting an analog radio frequency (RF) signal corresponding to the plurality of correlation-coded symbols and transferring the analog RF signal to a subscriber media IP access terminal in the cable broadcasting network through the communication unit.

When performing a correlation-coding on the plurality of symbols, the processor may perform performing a correlation operation between the plurality of symbols and a previous symbol or a following symbol having a forward relationship or a backward relationship with the plurality of symbols.

The correlation operation may include calculating a sum of a sequence represented by a product between the plurality of symbols and coefficients of the previous symbol or the following symbol.

When modulating uplink data to be transmitted to a broadcasting station which is located at an end of a cable broadcasting network into a plurality of symbols, the processor may perform correcting an error of a bit stream for the uplink data; and modulating error-corrected bit stream into an M-ary Quadrature Amplitude Modulation (QAM) symbol.

When outputting an analog radio frequency (RF) signal corresponding to the plurality of correlation-coded symbols, the processor may performs generating a pulse based on the plurality of correlation-coded symbols; and outputting the analog RF signal by up-converting a frequency of the pulse.

According to another exemplary embodiment, a method for processing an uplink signal of cable broadcasting network is provided. The method includes: modulating uplink data to be transmitted to a broadcasting station which is located at an end of the cable broadcasting network into a plurality of symbols; performing a correlation-coding on the plurality of symbols; and outputting an analog radio frequency (RF) signal corresponding to the plurality of correlation-coded symbols.

The performing a correlation-coding on the plurality of symbols may include performing a correlation operation between the plurality of symbols and a previous symbol or a following symbol having a forward relationship or backward relationship with the plurality of symbols.

The correlation operation may include calculating a sum of a sequence represented by a product between the plurality of symbols and coefficients of the previous symbol or the following symbol.

The modulating uplink data to be transmitted to a broadcasting station which is located at an end of a cable broadcasting network into a plurality of symbols may include: correcting an error of a bit stream for the uplink data; and modulating error-corrected bit stream into an M-ary Quadrature Amplitude Modulation (QAM) symbol.

The outputting an analog radio frequency (RF) signal corresponding to the plurality of correlation-coded symbols may include: generating a pulse based on the plurality of correlation-coded symbols; and outputting the analog RF signal by up-converting a frequency of the pulse.

According to yet another exemplary embodiment, a system for processing an uplink signal of cable broadcasting network is provided. The system includes: a cable modem (CM) device configured to generate a plurality of symbols by modulating uplink data to be transferred to a broadcasting station which is located at an end of the cable broadcasting network, create a correlation between the plurality of symbols by performing a correlation-coding on the plurality of symbols, and output an analog radio frequency (RF) signal based on the plurality of correlation-coded symbols; and a subscriber media IP access terminal configured to digitalize the analog RF signal and transfer an internet protocol (IP) signal including a digitalized RF signal to the broadcasting station.

The CM device may be further configured to perform a correlation operation between the plurality of symbols and a previous symbol or a following symbol having a forward relationship or a backward relationship with the plurality of symbols.

The correlation operation may include calculating a sum of a sequence represented by a product between the plurality of symbols and coefficients of the previous symbol or the following symbol.

DETAILED DESCRIPTION OF THE EMBODIMENTS

Figure 1:
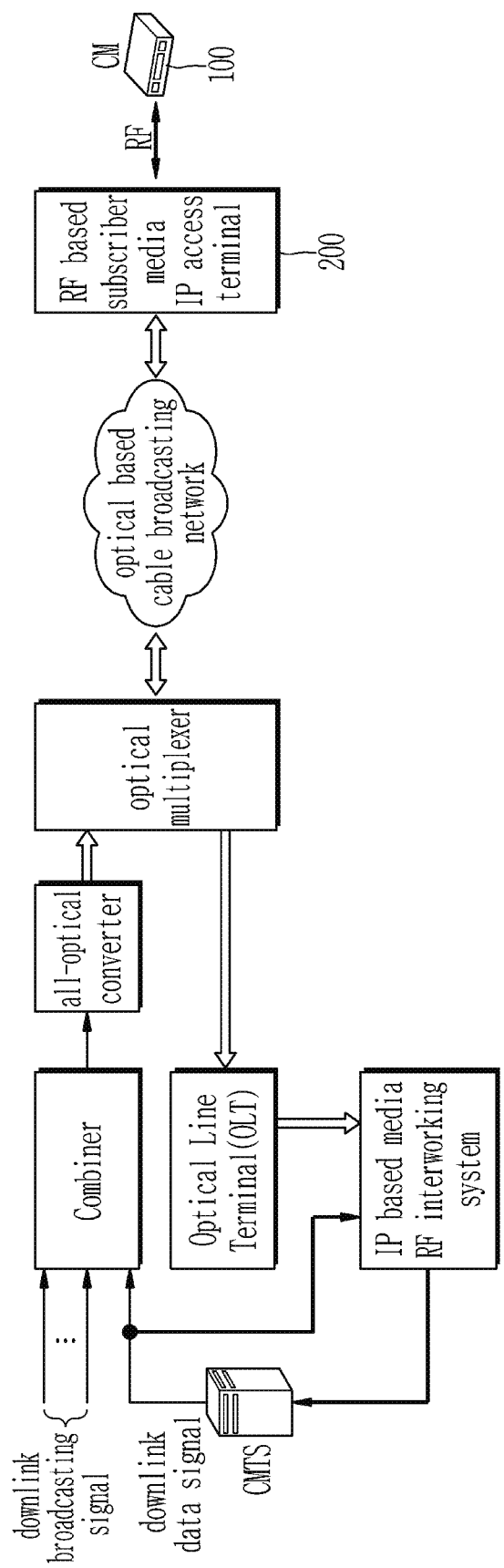
FIG. 1 is a schematic diagram illustrating a transmission and reception system of a broadcasting RF signal based on an internet protocol according to an exemplary embodiment.

In the following detailed description, only certain exemplary embodiments have been shown and described, simply by way of illustration. As those skilled in the art would realize, the described embodiments may be modified in various different ways, all without departing from the scope of the present disclosure. Accordingly, the drawings and description are to be regarded as illustrative in nature and not restrictive, and like reference numerals designate like elements throughout the specification.

FIG. 1 is a schematic diagram illustrating a transmission and reception system of a broadcasting RF signal based on an internet protocol according to an exemplary embodiment.

In FIG. 1, an uplink RF signal is digitalized and then transmitted in an internet protocol (IP) packet. An RF overlay scheme in which a signal is transmitted after being modulated into an optical signal through all-optical converters as in RFoG may be applied to a downlink RF signal.

Referring to FIG. 1, an RF-based subscriber media IP access terminal 200 which is located in the subscriber's home restores an optically modulated downlink RF signal received through an optical-based cable broadcasting network, and transmits the optically modulated downlink RF signal to an STB or a cable modem (CM) device through a coaxial cable. In addition, the RF-based subscriber media IP access terminal digitalizes the uplink RF signal output from the CM device 100 and transmits the digitalized uplink RF signal in the IP packet.

Transmission of the IP-based uplink RF signal may be performed as follows. When the CM device 100 outputs the uplink RF signal, the RF-based subscriber media IP access terminal may detect the uplink RF signal. When the uplink RF signal is detected, the RF-based subscriber media IP access terminal may perform an analog-to-digital conversion (ADC) to digitalize an analog RF signal and transmit an IP packet including the digitalized RF signal to the headend. The digitalized RF signal sent to the headend may be input to a modulator via internal devices (for example, routers, switches, and the like) of the headend connected to the IP network. The modulator located at the head end may perform digital to analog conversion (DAC) to restore the digitalized RF signal to an analog RF signal. The RF signal restored by the modulator then may be input to a CMTS. Accordingly, the CMTS may implement the same function as that the RF signal output from the CM device 100 may be directly transmitted to the CMTS may be implemented.

Figure 2:
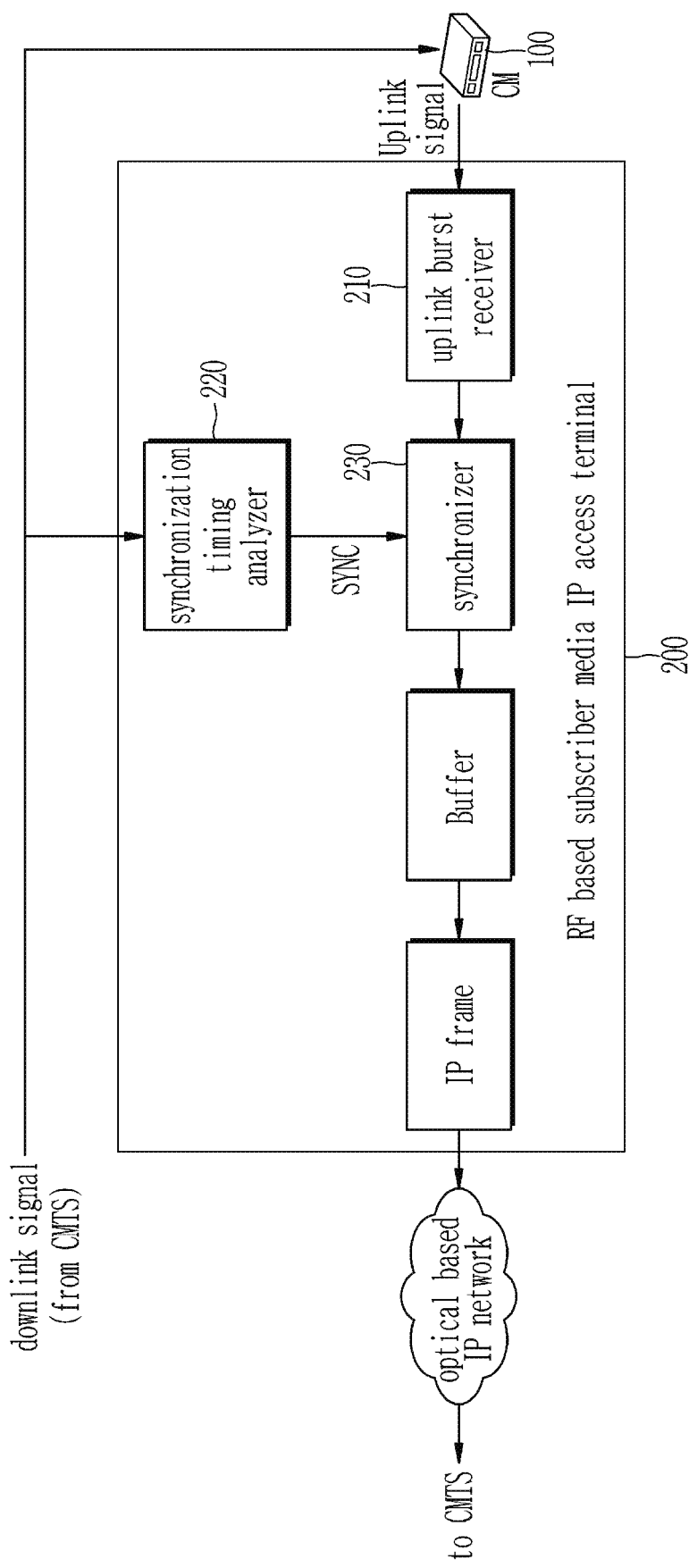
FIG. 2 is a block diagram illustrating an RF-based subscriber media IP access terminal according to an exemplary embodiment.
Figure 3A:
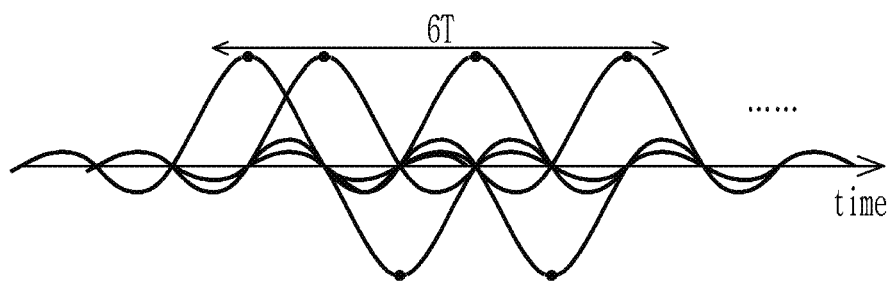
FIGS. 3A and 3B are a schematic diagram illustrating oversampling for digitalization of an uplink burst receiver according to an exemplary embodiment.
Figure 3B:
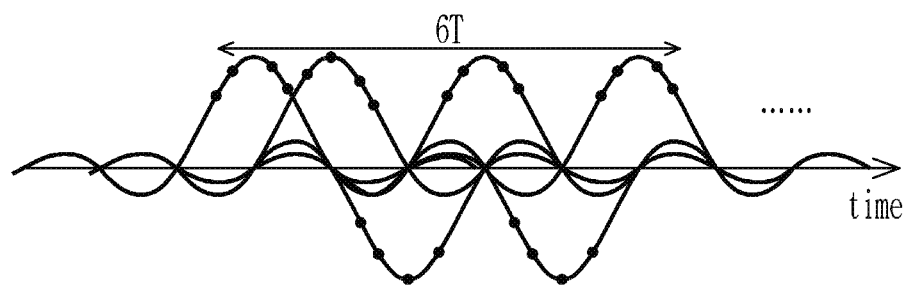

FIG. 2 is a block diagram illustrating an RF-based subscriber media IP access terminal according to an exemplary embodiment, and FIGS. 3A and 3B are a schematic diagram illustrating oversampling for digitalization of an uplink burst receiver according to an exemplary embodiment.

Referring to FIG. 2, the RF-based subscriber media IP access terminal 200 according to an exemplary embodiment includes an uplink burst receiver 210, a synchronization timing analyzer 220 and a synchronizer 230.

The uplink burst receiver 210 may receive an RF signal transmitted from the CM device and check the presence of an analog RF signal. When the analog RF signal from the CM exists, the uplink burst receiver 210 may perform down-conversion and digitalization on the analog RF signal, and transmit the digitalized RF signal to the synchronizer 230.

The synchronization timing analyzer 220 may transmit a synchronization message for downlink data transmitted from the CMTS to the synchronizer 230.

The synchronizer 230 may synchronize a clock of the digitalized RF signal by using the synchronization message for the downlink data and generate a band allocation time. The clocked uplink RF signal may be transferred to the CMTS in the form of an IP frame via the buffer 240. In this case, when the uplink burst receiver 210 digitalizes the uplink analog RF signal, the uplink burst receiver 210 may perform at least four times or more oversampling per symbol to prevent loss of the signal. Referring to FIG. 3A, a sampling scheme in which one sample is extracted per symbol is shown, and referring to FIG. 3B, an oversampling scheme in which 4 samples are extracted per symbol is shown. When four times oversampling is performed as in (b), the amount of data to be processed is increased by four times and the amount of data to be transmitted is increased by four times, therefore, the transmission rate of the system is reduced. Hereinafter, a method for lowering the sampling rate of oversampling by providing correlation between symbols is described.

Figure 4:
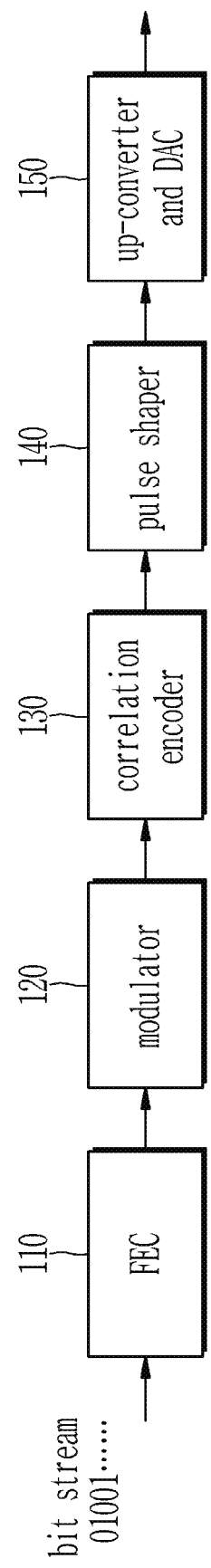
FIG. 4 is a block diagram illustrating a CM device according to an exemplary embodiment.
Figure 5:
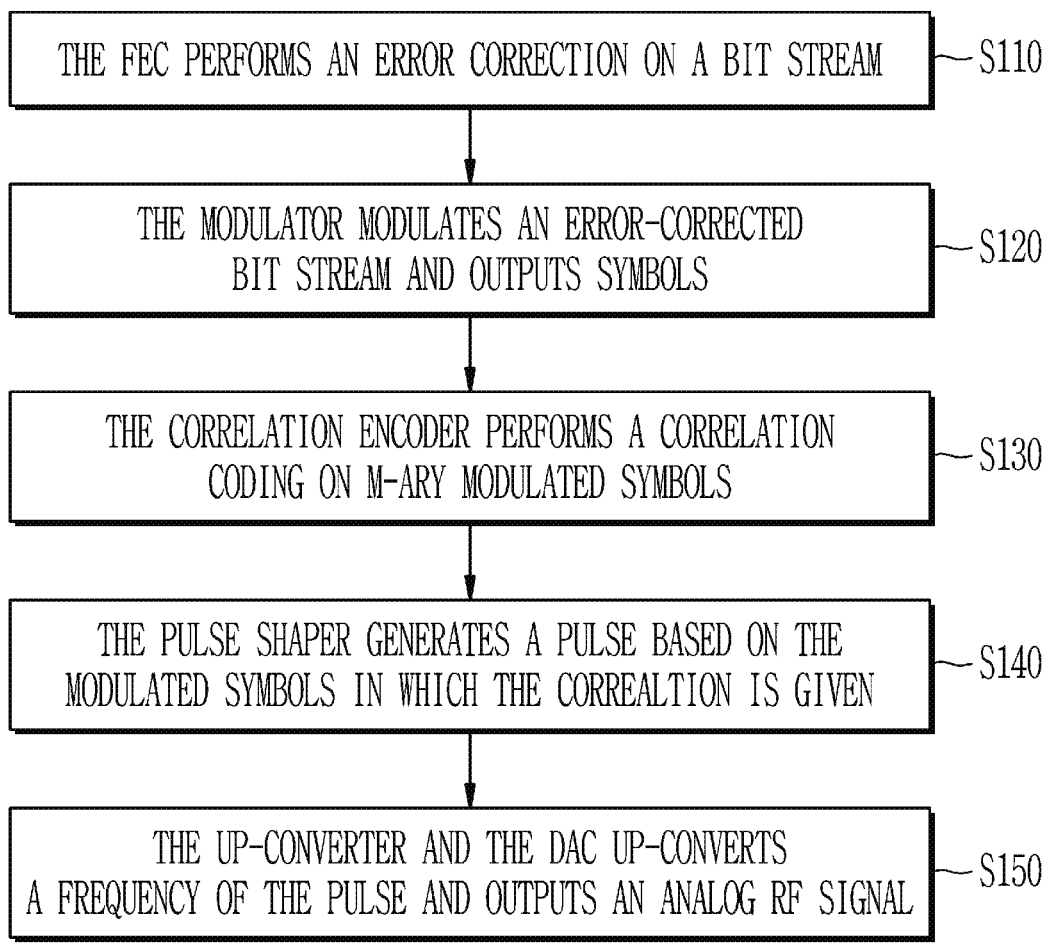
FIG. 5 is a flowchart illustrating an operation of the CM device according to an exemplary embodiment.
Figure 6:
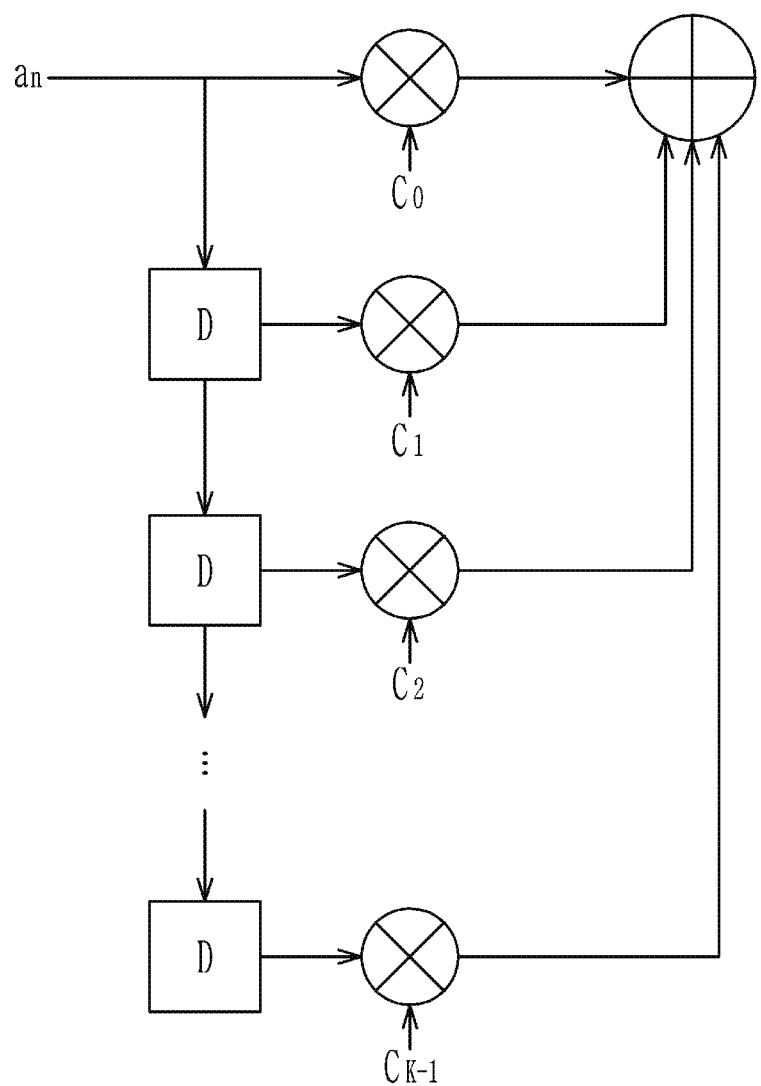
FIG. 6 is a schematic diagram illustrating a correlation encoder of the CM device according to an exemplary embodiment.

FIG. 4 is a block diagram illustrating a CM device according to an exemplary embodiment, FIG. 5 is a flowchart illustrating an operation of the CM device according to an exemplary embodiment, and FIG. 6 is a schematic diagram illustrating a correlation encoder of the CM device according to an exemplary embodiment.

Referring to FIG. 4, the CM device 100 according to an exemplary embodiment includes a forward error corrector (FEC) 110, a modulator 120, a correlation encoder 130, a pulse shaper 140, an up-converter and a DAC 150.

Referring to FIG. 5, a bit stream representing uplink data to be transmitted to the CMTS is error-corrected by the FEC 110 (S110), and then, modulated by the modulator 120 (S120). The modulator 120 may perform M-ary modulation and may, for example, modulate the bit stream encoded by the FEC 110 into Quadrature Amplitude Modulation (QAM) symbols.

The correlation encoder 130 may provide correlation to the M-ary QAM (M-QAM) modulated symbol output from the modulator 120 by performing a correlation-coding on the M-ary modulated symbols (S130).

The pulse generator 140 may generate a pulse based on the modulated symbols in which the correlation is given (S140). In this case, the pulse generator 140 may perform a function of a band stop filter.

The up-converter and the DAC 150 may up-convert a frequency of the pulse and output an analog RF signal (S150). The correlation encoder 130 according to an exemplary embodiment may perform the correlation-coding by using a polynomial of Equation 1 below. In Equation 1, D may mean a delay.

$$1D + D^2 + \ldots + D^{K-1} \quad \text{[Equation 1]}$$

Referring to FIG. 6, $a_n$ is an n-th transmitted M-QAM modulated symbol. When a length of a frame including the plurality of symbols is N, the modulated symbol a may be represented by Equation 2 below.

$$a = [a_0 a_1 \ldots a_n \ldots a_{N-1}] \quad \text{[Equation 2]}$$

According to an exemplary embodiment, the correlation coding may be performed to provide correlation between previous symbols and following symbols by the correlation operation of Equation 3.

$$b_n = \sum_{i=0}^{K-1} c_i \cdot a_{n-i} \quad \text{[Equation 3]}$$

In Equation 3, $c_i$ is a coefficient of i-th delayed symbol. Referring to Equation 3, the correlation-coded modulation symbol $b_n$ corresponding to the n-th transmitted modulation symbol $a_n$ may be determined by summing a sequence represented as a product between the modulated symbol $a_n$ and the coefficient $c_i$ of the i-th delayed modulation symbol. In other words, the modulated symbol $b_n$ may include the correlation between the modulated symbol $a_n$ and the previous symbol or the following symbol of the modulated symbol $a_n$. The correlation coded modulation symbol b output from the correlation encoder 130 may be expressed by Equation 4 below.

$$b = [b_0 b_1 \ldots b_n \ldots b_{N-1}] \quad \text{[Equation 4]}$$

The correlation coded modulation symbol b may be then converted into an RF signal having an appropriate band via the band stop filter and then be transmitted. The modulated symbol on which the correlation-coding operation is performed may include information of the previous symbol.

Subsequently, when the CMTS detects an uplink stream corresponding to the modulated symbol a which is an original signal from an uplink stream corresponding to the modulated symbol b, an additional operation may be required. For an operation for detecting a stream corresponding to an original symbol from the correlation-coded stream, various technique such as MLSE (Maximum Likelihood Sequence Estimation), or Trellis-based Viterbi, or BCJR (Bahl, Cocke, Jelinek, and Raviv) may be used. These detection techniques may be rather complicated and require a large amount of computation, but it can be applied without difficulty since the CMTS, which is a broadcasting company's headend equipment, may be added.

According to the exemplary embodiment, since information of the plurality of symbols is included in one transmission pulse corresponding to one modulated symbol, a large amount of information may be extracted only by the relatively low-degree of sampling. In other words, since the sampling rate for the oversampling performed when digitalizing the analog RF signal can be reduced, the transmission rate of the system can be increased.

Figure 7:
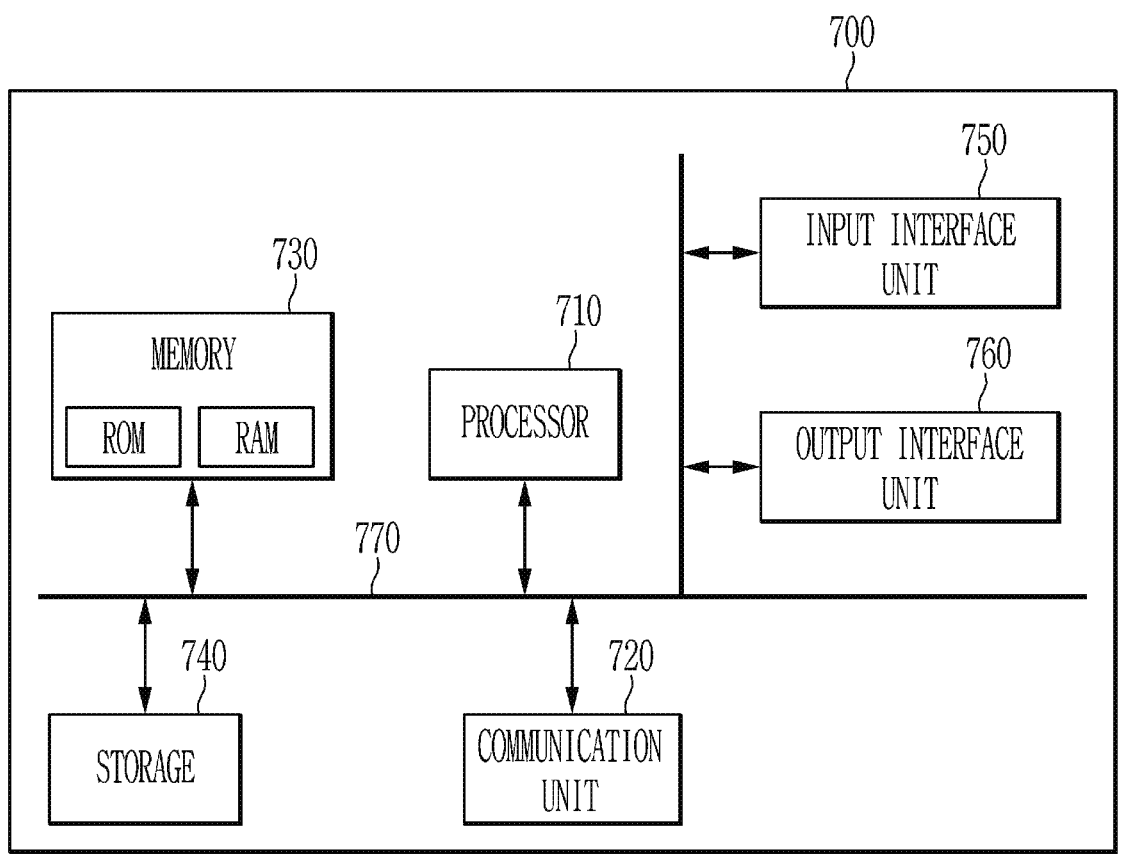
FIG. 7 is a block diagram illustrating a CM device according to another exemplary embodiment.

FIG. 7 is a block diagram illustrating a CM device according to another exemplary embodiment.

The CM device according to another exemplary embodiment may be implemented as a computer system, for example a computer readable medium. Referring to FIG. 7, a computer system 700 may include at least one of processor 710, a memory 730, an input interface unit 750, an output interface unit 760, and storage 740. The computer system 700 may also include a communication unit 720 coupled to a network. The processor 710 may be a central processing unit (CPU) or a semiconductor device that executes instructions stored in the memory 730 or storage 740. The memory 730 and the storage 740 may include various forms of volatile or non-volatile storage media. For example, the memory may include read only memory (ROM) 731 or random access memory (RAM) 732. In the exemplary embodiment of the present disclosure, the memory may be located inside or outside the processor, and the memory may be coupled to the processor through various means already known.

Thus, the embodiments may be embodied as a computer-implemented method or as a non-volatile computer-readable medium having computer-executable instructions stored thereon. In the exemplary embodiment, when executed by a processor, the computer-readable instructions may perform the method according to at least one aspect of the present disclosure. The communication unit 720 may transmit or receive a wired signal or a wireless signal.

On the contrary, the embodiments are not implemented only by the apparatuses and/or methods described so far, but may be implemented through a program realizing the function corresponding to the configuration of the embodiment of the present disclosure or a recording medium on which the program is recorded. Such an embodiment can be easily implemented by those skilled in the art from the description of the embodiments described above. Specifically, methods (e.g., network management methods, data transmission methods, transmission schedule generation methods, etc.) according to embodiments of the present disclosure may be implemented in the form of program instructions that may be executed through various computer means, and be recorded in the computer-readable medium. The computer-readable medium may include program instructions, data files, data structures, and the like, alone or in combination. The program instructions to be recorded on the computer-readable medium may be those specially designed or constructed for the embodiments of the present disclosure or may be known and available to those of ordinary skill in the computer software arts. The computer-readable recording medium may include a hardware device configured to store and execute program instructions. For example, the computer-readable recording medium can be any type of storage media such as magnetic media like hard disks, floppy disks, and magnetic tapes, optical media like CD-ROMs, DVDs, magneto-optical media like floptical disks, and ROM, RAM, flash memory, and the like. Program instructions may include machine language code such as those produced by a compiler, as well as high-level language code that may be executed by a computer via an interpreter, or the like.

While this disclosure has been described in connection with what is presently considered to be practical example embodiments, it is to be understood that this disclosure is not limited to the disclosed embodiments, but, on the contrary, is intended to cover various modifications and equivalent arrangements included within the spirit and scope of the appended claims.

What is claimed is:

1. An apparatus for processing an uplink signal of cable broadcasting network, the apparatus comprising:
   a processor, a memory, and a communication unit, wherein
   the processor executes a program stored in the memory to perform:
   modulating uplink data to be transmitted to a broadcasting station which is located at an end of a cable broadcasting network into a plurality of symbols;
   performing a correlation-coding on the plurality of symbols; and
   outputting an analog radio frequency (RF) signal corresponding to the plurality of correlation-coded symbols and transferring the analog RF signal to a subscriber media IP access terminal in the cable broadcasting network through the communication unit.

2. The apparatus of claim 1, wherein
   when performing a correlation-coding on the plurality of symbols, the processor performs
   performing a correlation operation between the plurality of symbols and a previous symbol or a following symbol having a forward relationship or a backward relationship with the plurality of symbols.

3. The apparatus of claim 2, wherein:
   the correlation operation includes calculating a sum of a sequence represented by a product between the plurality of symbols and coefficients of the previous symbol or the following symbol.

4. The apparatus of claim 1, wherein:
   when modulating uplink data to be transmitted to a broadcasting station which is located at an end of a cable broadcasting network into a plurality of symbols, the processor performs:
   correcting an error of a bit stream for the uplink data; and
   modulating error-corrected bit stream into an M-ary Quadrature Amplitude Modulation (QAM) symbol.

5. The apparatus of claim 1, wherein:
   when outputting an analog radio frequency (RF) signal corresponding to the plurality of correlation-coded symbols, the processor performs:
   generating a pulse based on the plurality of correlation-coded symbols; and
   outputting the analog RF signal by up-converting a frequency of the pulse.

6. A method for processing an uplink signal of cable broadcasting network, the method comprising:
   modulating uplink data to be transmitted to a broadcasting station which is located at an end of the cable broadcasting network into a plurality of symbols;
   performing a correlation-coding on the plurality of symbols; and
   outputting an analog radio frequency (RF) signal corresponding to the plurality of correlation-coded symbols.

7. The method of claim 6, wherein:
   the performing a correlation-coding on the plurality of symbols includes
   performing a correlation operation between the plurality of symbols and a previous symbol or a following symbol having a forward relationship or backward relationship with the plurality of symbols.

8. The method of claim 7, wherein:
   the correlation operation includes calculating a sum of a sequence represented by a product between the plurality of symbols and coefficients of the previous symbol or the following symbol.

9. The method of claim 6, wherein:
   the modulating uplink data to be transmitted to a broadcasting station which is located at an end of a cable broadcasting network into a plurality of symbols includes:
   correcting an error of a bit stream for the uplink data; and
   modulating error-corrected bit stream into an M-ary Quadrature Amplitude Modulation (QAM) symbol.

10. The method of claim 6, wherein:
    the outputting an analog radio frequency (RF) signal corresponding to the plurality of correlation-coded symbols includes:
    generating a pulse based on the plurality of correlation-coded symbols; and
    outputting the analog RF signal by up-converting a frequency of the pulse.

11. A system for processing an uplink signal of cable broadcasting network, the system comprising:
    a cable modem (CM) device configured to generate a plurality of symbols by modulating uplink data to be transferred to a broadcasting station which is located at an end of the cable broadcasting network, create a correlation between the plurality of symbols by performing a correlation-coding on the plurality of symbols, and output an analog radio frequency (RF) signal based on the plurality of correlation-coded symbols; and
    a subscriber media IP access terminal configured to digitalize the analog RF signal and transfer an internet protocol (IP) signal including a digitalized RF signal to the broadcasting station.

12. The system of claim 11, wherein:
    the CM device is further configured to perform a correlation operation between the plurality of symbols and a previous symbol or a following symbol having a forward relationship or a backward relationship with the plurality of symbols.

13. The system of claim 12, wherein:
    the correlation operation includes calculating a sum of a sequence represented by a product between the plurality of symbols and coefficients of the previous symbol or the following symbol.

* * * * *